United States Patent [19]

DeCaro

[11] Patent Number: 4,550,476

[45] Date of Patent: Nov. 5, 1985

[54] ADJUSTMENT MEANS FOR A DRIVER BIT

[75] Inventor: Charles J. DeCaro, Charlotte, N.C.

[73] Assignee: Textron Inc., Providence, R.I.

[21] Appl. No.: 570,280

[22] Filed: Jan. 12, 1984

Related U.S. Application Data

[63] Continuation-in-part of Ser. No. 466,637, Feb. 18, 1983, Pat. No. 4,491,443.

[51] Int. Cl.[4] .......... B23B 45/00; B25F 1/10

[52] U.S. Cl. .......... 29/26 A; 7/158; 279/83; 408/241 R; 81/451

[58] Field of Search .......... 408/239 R, 1 R, 241 R, 408/238; 29/26 A, 26 B; 81/451, 438, 439; 7/158; 279/1 A, 83

[56] References Cited

U.S. PATENT DOCUMENTS

| | | | |
|---|---|---|---|
| 3,023,015 | 2/1962 | Pankow | 408/238 X |
| 3,753,454 | 8/1973 | Totsu | 81/451 |
| 3,841,646 | 10/1974 | Bennett | 279/83 X |
| 4,266,895 | 5/1981 | Lewis | 279/83 X |

FOREIGN PATENT DOCUMENTS

| | | | |
|---|---|---|---|
| 508758 | 10/1920 | France | 81/451 |

*Primary Examiner*—Z. R. Bilinsky
*Attorney, Agent, or Firm*—Webb, Burden, Robinson & Webb

[57] ABSTRACT

The adapter for the torquing tool includes an elongated body having a bore in at least one end to accommodate a driver bit and a coupling means for detachably attaching the body to the tool. A depth adjustment bushing is threadably engaged within said bore, with the bushing being externally threaded to engage the bore. The bushing includes a body section and a shank section. An axial passageway extends through the shank section and an axial slot extending through the wall of the shank in communication with the passageway. A screw extends through a radial threaded opening in the body and into the axial passageway through the slot so when the driver bit is housed within the body section and extends into the passageway, it is held in place by tightening the screw. In a preferred form, the passageway has a hexagonal cross section for mating engagement with a hexagonal end section of the driving bit.

7 Claims, 6 Drawing Figures

ADJUSTMENT MEANS FOR A DRIVER BIT

CROSS-REFERENCE TO RELATED APPLICATIONS

This application is a continuation-in-part of U.S. application Ser. No. 466,637 filed Feb. 18, 1983, now U.S. Pat. No. 4,491,443.

FIELD OF THE INVENTION

My invention relates to adapters and reversible adapters for use with a standard power unit for drilling a hole and thereafter for torquing a fastener into the hole just drilled and more particularly, to an adjustment means internal of the adapter for adjusting the driver bit to torque the fastener.

DESCRIPTION OF THE PRIOR ART

There are many applications which require a power drill to form a hole in the workpiece and a power installation tool to set a fastener in the predrilled hole. It is now known to combine the tooling to accomplish these functions into a single reversible drilling and torquing adapter which attaches to a power installation tool and which accommodates a drill bit at one end and a driver bit at the other end.

It has also been recognized that it is advantageous to prevent overdriving of the fastener which is installed in the predrilled hole. Copending application Ser. No. 353,223 filed Mar. 1, 1982, now abandoned, discloses an internal adjustment for a driver bit which consists of a set screw threadably engaged within an internal threaded section of the adapter and against which the driver bit abuts in end-to-end relationship.

The need remains for a simple adjustment means to control the depth of drive of the fastener wherein the adjustment is easily and readily accessible to the user of the tool and in which no special tooling is required.

SUMMARY OF THE INVENTION

I have now provided an adjustment means for the driver bit which requires no special tooling and which is readily accessible to the user of the power tool. The adjustment is simple to perform and the adjustment means allows for rapid and accurate adjustment.

I provide a depth adjustment bushing which threadably engages within the bore of an adapter. The bushing includes an externally threaded shank for engagement with the bore, an axial passageway through the shank and an axial slot extending through the shank and in communication with the passageway. The bushing includes a hollow body section forward of the shank. A screw threadably engages in a radial opening through the body of the adapter, and extends through the slot and into the passageway where the driver bit is housed. The bushing is rotatable so as to align the slot and the radial opening and screw so the screw can be tightened into engagement with the drill bit. In a preferred form of the invention, the passageway in the adapter is configured in cross section so as to matingly engage the driver bit which it accommodates.

DESCRIPTION OF THE PREFERRED EMBODIMENTS

Figure 1:
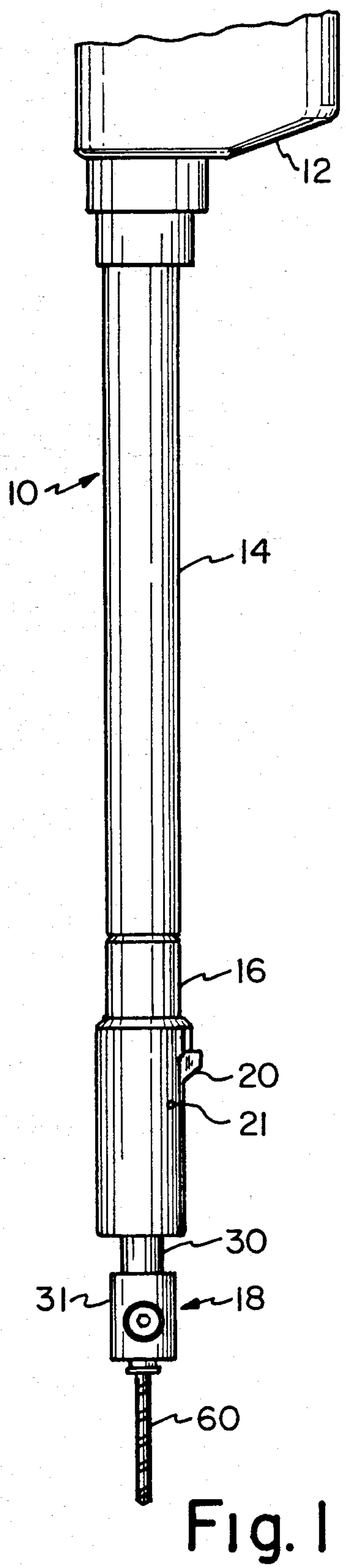
FIG. 1 is a front elevation of a power tool including a sleeve and an adapter.

The tool, generally designated 10, comprises a power unit 12, an elongated sleeve 14 attached to the power unit 12 and a sleeve extension 16 attached to the elongated sleeve 14 by conventional means which do not form a part of the subject invention, FIG. 1. A reversible adapter 18 is attached to the distal end of the sleeve extension 16 and the two sleeves and adapter are caused to rotate by the power unit 12.

Figure 2:
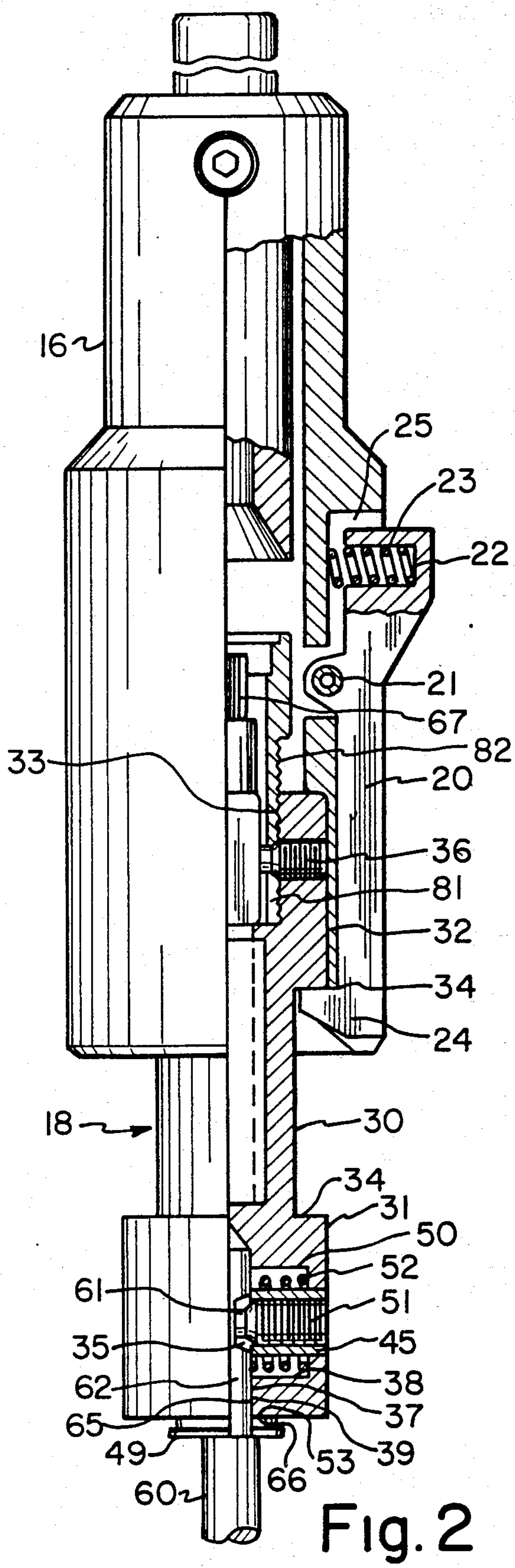
FIG. 2 is a front elevation partly in section showing the sleeve and the adapter.

The sleeve extension 16 includes a slot 25 which accommodates a latch member 20 by means of pivot pin 21 extending through the sleeve and transverse of the slot, FIG. 2. Coil spring 22 is housed within slot 23 in latch member 20 and is attached to sleeve extension 16 so as to maintain latch member 20 in the closed position. Latch member 20 terminates in an inwardly extending finger 24 which detachably retains the adapter 18 within the bore of sleeve extension 16.

The adapter 18 comprises an elongated cylindrical body 30 having an enlarged cylindrical section 31 inward of one end and an enlarged cylindrical section 32 inward of the other end, FIG. 2. Each enlarged section defines a shoulder 34 against which finger 24 of latch member 20 engages so as to retain the adapter 18 in the sleeve extension 16. Depression of the latch member 20 causes pivoting about the pin 21 and disengages the finger 24 from the shoulder 34 permitting the adapter to be removed and/or reversed, FIG. 2.

The bore 35 extends into one end of the adapter 18 to accommodate a drill bit 60. The lower portion 37 of bore 35 has a D-shaped cross section. Thus, adapter 18 includes a flat surface 39. Washer 49 is disposed along drill bit 60 so that it abuts the lower surface 53 of adapter 30.

A bore 33 extends into the opposite end of adapter 18 to accommodate adjustment bushing 82 and driver bit 67, FIG. 2. Driver bit 67 in FIG. 2 is illustrated as a phillips head driver bit.

Figure 3:
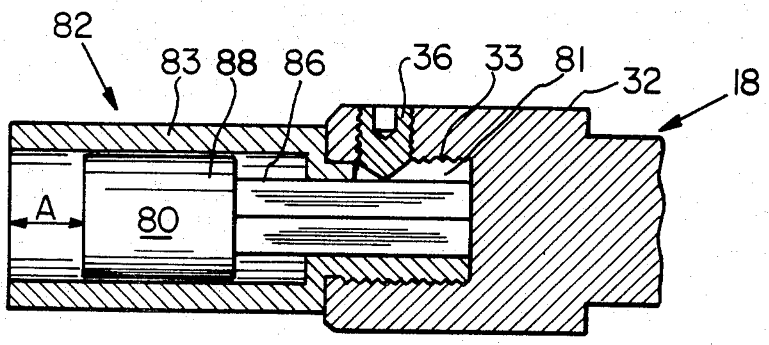
FIG. 3 is a section taken along the axial center line of the adjustment bushing and a portion of the adapter.
Figure 4:
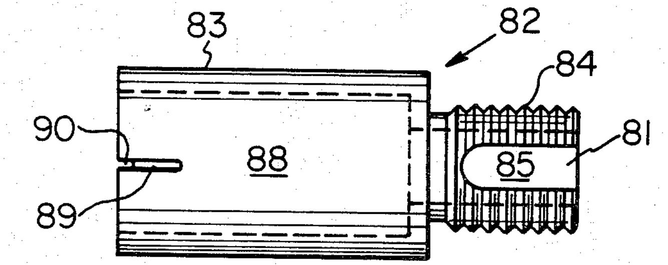
FIG. 4 is a side elevation of the adjustment bushing.
Figure 5:
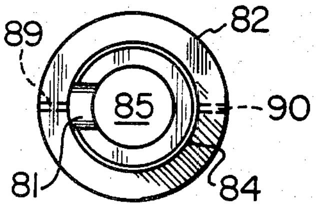
FIG. 5 is an end view of the adjustment bushing.

The relationship of the adjustment bushing 82 in the adapter 18 is best illustrated in FIG. 3 where a socket-type driver bit 80 is illustrated. Adjustment bushing 82 consists of an enlarged hollow cylindrical section 83 and an adjacent externally threaded shank section 84, FIGS. 4 and 5. Circular cross sectional passageway 88 internal of cylindrical section 83 is in communication with circular cross sectional passageway 85 having a smaller diameter and which extends through shank section 84. A clearthrough slot 81 extends through shank section 84 into communication with passageway 85. A thin slot 89 extends inward from the distal end of enlarged cylindrical section 83 in alignment with slot 81 and a second thin slot 90 of lesser axial extent also extends inward of the distal end of cylindrical section 83. Slot 90 is positioned diametrically opposite to slot 89.

Adjustment bushing 82 is threaded into bore 33 of adapter 18, FIG. 3. Driver bit 80 is inserted into enlarged section 83 until the shank 86 of driver bit 80 engages the blind end of bore 33. Set screw 36, which radially extends through enlarged section 32 of adapter 18 is tightened until it engages shank 86 to retain driver bit 80 in place. Set screw 36 also extends through slot 81. Adjustment of bushing 82 controls the distance A between the driver bit 80 and the distal end of bushing 82. It is desired that the distance A be substantially equal to the axial extent of the fastener head being driven so that torquing of the fastener ceases when the fastener head engages the workpiece. To adjust the distance A, the set screw 36 is loosened and a coin such as a quarter is inserted into slots 89 and 90 and rotated so that bushing 82 advances or recedes the desired amount. When slot 89 is aligned with set screw 36, the worker knows the slot 81 is also in alignment with the set screw 36. Set screw 36 is then tightened against one of the flats which form the hex shank 86. Fine threads are employed on shank 84 so that 360° of rotation of bushing 82 results in a fine adjustment.

Figure 6:
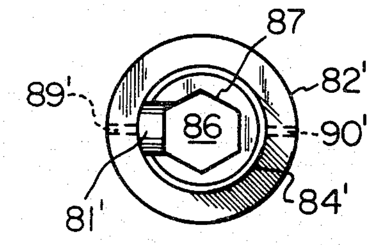
FIG. 6 is an end view of a modified adjustment bushing.

A preferred form of adjustment bushing 82' is illustrated in FIG. 6 where the passageway 87 through the shank end 84' is hexagonal in shape so as to matingly engage the hex shank 86 of the driver bit 80. Cross sectional passageway 87 is positioned so that a flat of the hex crosses the slot 81', thereby assuring that a flat of the hex is exposed to be engaged by the set screw. In the earlier embodiment, the set screw retains the shank and causes rotation of the driver bit 80 whereas in the embodiment of FIG. 6 the mating hex surfaces of the passageway 85 and the driver bit shank 86 cause rotation of the driver bit and the set screw merely retains the driver bit from falling out of the adapter 18.

It is to be understood that the present invention is not limited to the particular structure shown in the drawings, but also includes any modification within the scope of the appended claims.

I claim:

1. In an adapter for a torquing tool including an elongated body having a bore in at least one end to accommodate a working member and a coupling means for detachably attaching the body to the tool, the improvement comprising a depth adjustment bushing threadably engaged within said bore, said bushing including an externally threaded shank for engagement with said bore, an axial passageway through said shank, an axial slot extending through said shank in communication with said passageway and a hollow body section forward of said shank and a screw threadably engaged in a radial opening through the body into the bore whereby said working member is housed within said hollow body section and extends into said passageway, said bushing being rotatable so as to align the slot and the radial opening so that the screw can be tightened into engagement with the working member through said slot.

2. The improvement of claim 1 wherein said passageway has a polygonal cross section for mating engagement with a polygonal end section of said working member.

3. The improvement of claim 2 wherein said passageway is hexagonal in cross section with said slot extending across a single flat face of the hexagonal cross section.

4. The improvement of claim 1, said hollow body section including external marker means in axial alignment with said slot so that said slot can be aligned with said set screw.

5. The improvement of claim 4, said marker means comprising a first thin slot extending axially inward from a distal end of said body section.

6. The improvement of claim 5 including a second thin slot extending axially inward from said distal end diametrically opposed to said first thin slot, said first and second slot forming a receiving means for a turning device to adjust said bushing in said elongated body.

7. The adapter of claim 1 being reversible with respect to said torquing tool and including means to receive a drilling bit at a first end and said bore for receiving a fastener driving member at an opposite end.

* * * * *